Oct. 16, 1956 D. F. BALMER ET AL 2,766,990

OPTICAL INDICATING APPARATUS FOR DICTATING MACHINES

Filed March 22, 1950 4 Sheets-Sheet 1

INVENTORS
DONALD F. BALMER
FRANK E. RUNGE
BY H. G. Manning
ATTORNEY

Oct. 16, 1956 D. F. BALMER ET AL 2,766,990

OPTICAL INDICATING APPARATUS FOR DICTATING MACHINES

Filed March 22, 1950 4 Sheets-Sheet 2

INVENTORS
DONALD F. BALMER
FRANK E. RUNGE
BY
H. G. Manning
ATTORNEY

OPTICAL INDICATING APPARATUS FOR DICTATING MACHINES
Filed March 22, 1950 4 Sheets-Sheet 3
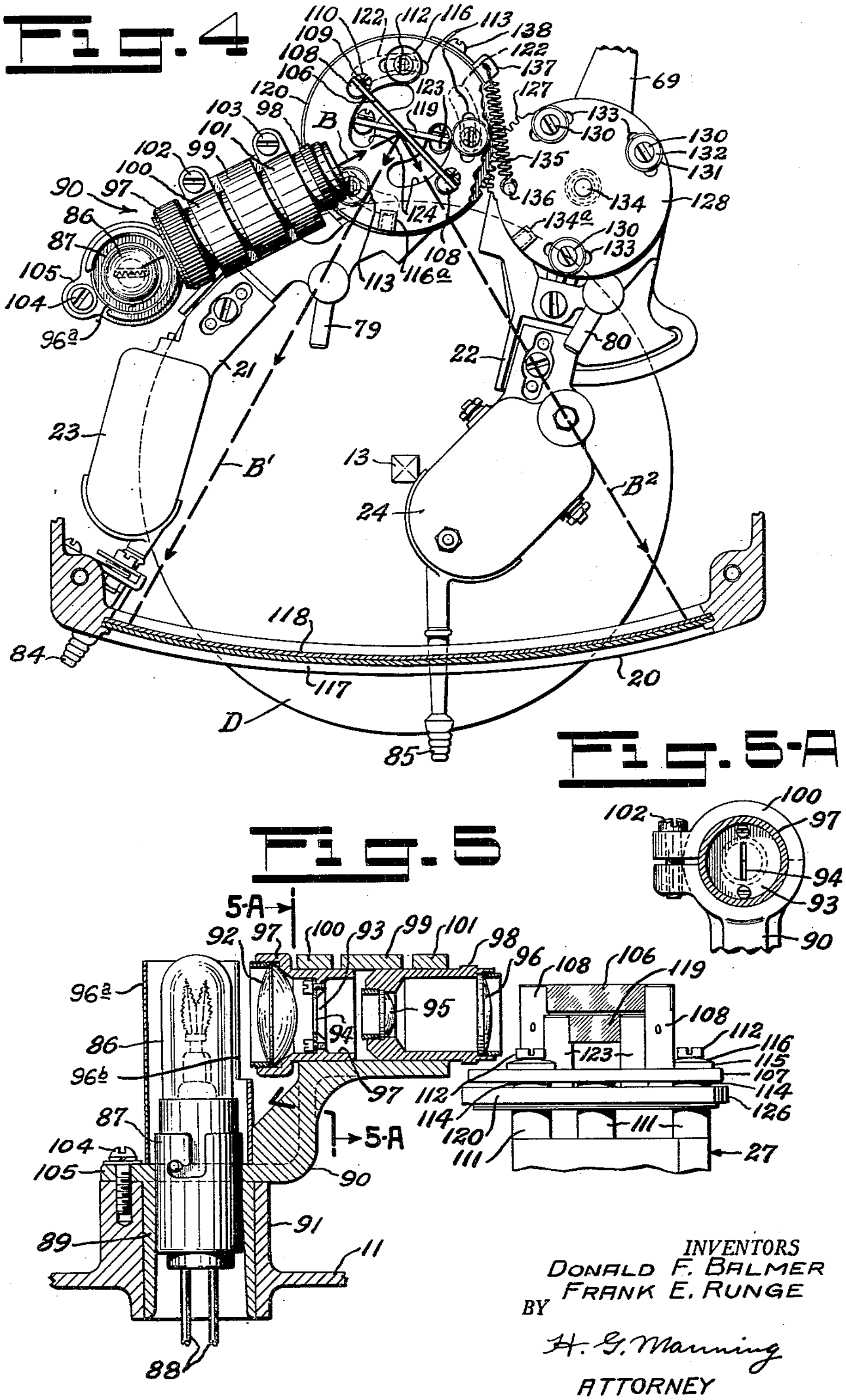
Fig. 4, Fig. 5-A, Fig. 5
INVENTORS
DONALD F. BALMER
FRANK E. RUNGE
BY
H. G. Manning
ATTORNEY Oct. 16, 1956 D. F. BALMER ET AL 2,766,990

OPTICAL INDICATING APPARATUS FOR DICTATING MACHINES

Filed March 22, 1950 4 Sheets-Sheet 4

INVENTORS
DONALD F. BALMER
FRANK E. RUNGE
BY
H. G. Manning
ATTORNEY

United States Patent Office 2,766,990

Patented Oct. 16, 1956

2,766,990

OPTICAL INDICATING APPARATUS FOR DICTATING MACHINES

Donald F. Balmer, East River, and Frank E. Runge, Branford, Conn., assignors to The Soundscriber Corporation, New Haven, Conn., a corporation of Connecticut

Application March 22, 1950, Serial No. 151,106

4 Claims. (Cl. 274—1)

This invention relates to indicating and place-finding devices for phonographic dictating machines, and more particularly to an optical indicating apparatus which is adapted for use in dictating machines of the type having a pair of stylus-carrying arms or carriages which are movable across a single revolving record disk for respectively recording and playing back a spiral groove or sound track on the disk.

One object of this invention is to provide an apparatus of the above nature wherein the positions of both of the arms with relation to the disk and to each other will be indicated by means of light beams which have congruent ranges of movement upon a single transparent consecutively numbered scale.

Another object is to provide an apparatus of the above nature in which equal movements of the arms will produce synchronized indications upon the scale.

Another object is to provide an apparatus of the above nature wherein the scale is adapted to provide a greatly magnified representation of the full range of movement of both of the arms without occupying excessive space in the machine.

Another object is to provide an apparatus of the above nature in which any desired predetermined relationship of the respective arms will be indicated when the light beams are superimposed at any point on the scale.

Another object is to provide an apparatus of the above nature which may be so adjusted that engagement of the recording and playback styli with the same turn of the spiral groove at respectively opposite sides of the center of the record disk will always produce superimposed indications upon the scale.

Another object is to provide mechanism whereby an indicating means of the type in which a swingable light beam serves as an index upon a scale (such as has been used for example in the electrical art in connection with the d'Arsonval galvanometer) may be adapted for accurately indicating the positions of a plurality of individually swingable separate members upon a single consecutively numbered index scale.

Another object is to provide an apparatus of the above nature in which all necessary adjustments may readily be made, and which will not accidentally deviate from its adjusted condition.

A further object is to provide an apparatus of the above nature which will be simple in construction, inexpensive to manufacture, accurate, compact, and very efficient and reliable in use.

With these and other objects in view, there has been illustrated on the accompanying drawing one form in which the invention may conveniently be embodied in practice.

In the drawing,

Fig. 4 is a partial sectional plan view which is similar in location to Figs. 2 and 3, but which shows the indicating apparatus as it would appear when the playback arm is disposed adjacent the periphery of the disk, and the recording arm is disposed adjacent the center of the disk.

Fig. 5 is a vertical sectional view taken substantially on the line 5—5 of Fig. 2, showing the optical assembly on an enlarged scale, and also showing in elevation the relation of the mirrors thereto.

Fig. 5–A is a cross sectional view taken on the line 5A—5A of Fig. 5, showing the slit for restricting the light to a narrow beam in a vertical plane.

Figures 1, 2:
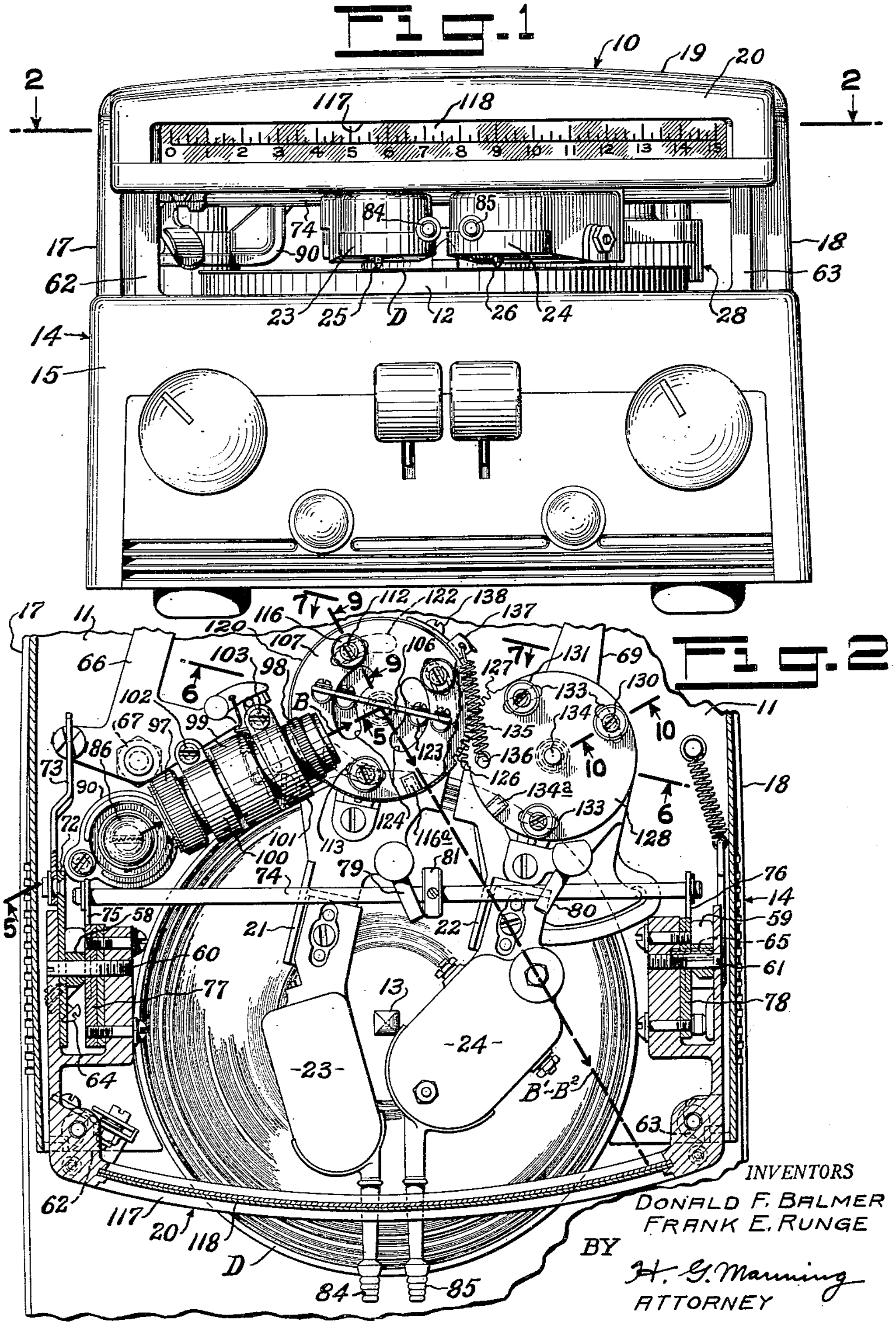
Fig. 1 is a front view of a dictating machine embodying the improved indicating apparatus.
Fig. 2 is a cross sectional plan view of a portion of the dictating machine taken on the line 2—2 of Fig. 1, showing the indicating apparatus as it would appear when the styli of the recording and playback arms are disposed at the final turn of the record groove adjacent the center of the record disk.
Figures 6, 7, 8, 9, 10:
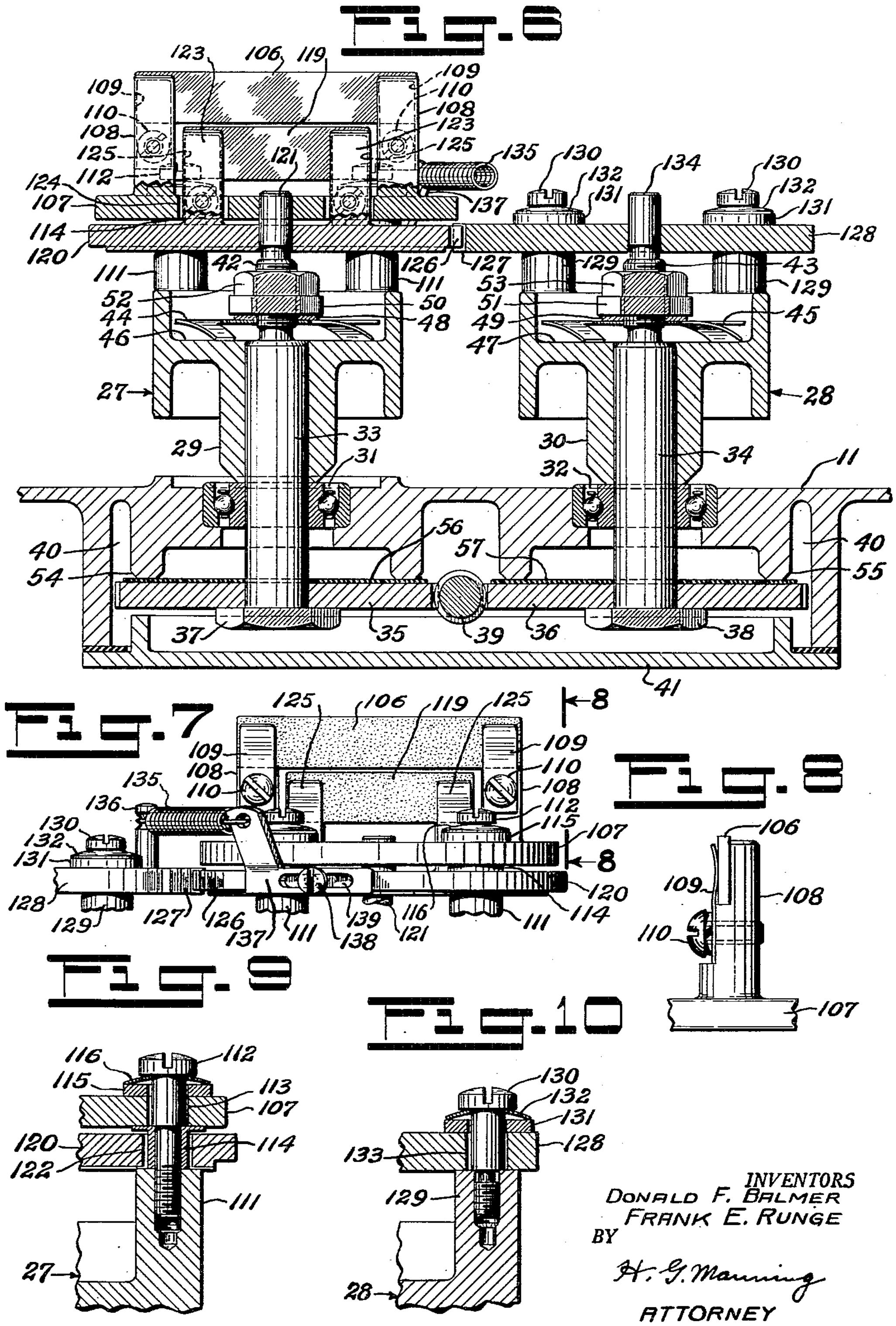

Fig. 6 is a partial cross sectional view taken on the line 6—6 of Fig. 2, but on a larger scale, showing the means for swingably supporting and driving the recording and playback arms, and also showing the swingable mirrors for directing light beams against the scale.

Fig. 7 is a partial cross sectional view, taken on the line 7—7 of Fig. 2, showing the swingable mirrors and the mounting means therefor, as they would appear from the rear.

Fig. 8 is a partial side view of one of the mirror mountings, taken on the line 8—8 of Fig. 7.

Fig. 9 is a cross sectional view, taken on the line 9—9 of Fig. 2, but on a larger scale, illustrating the manner in which the mirror mountings are supported upon the hub of the playback arm.

Fig. 10 is a cross sectional view, taken on the line 10—10 of Fig. 2, but on a larger scale, showing the adjustable securement of the gear sector disk to the recording arm mounting hub.

Referring now to the drawings in which like reference numerals denote corresponding parts throughout the several views, the numeral 10 indicates a dictating machine which embodies the improved optical indicating apparatus. The machine 10 may be of the type which is disclosed in the copending application of Anthony C. DeNapoli, Jr. and Frank E. Runge, entitled "Recording and Playback Arm Operating and Setting Means for Dictating Machines," Ser. No. 136,222, filed December 31, 1949, and comprises a horizontal motor board 11 which carries a turntable 12 by means of a rotatable vertical spindle 13, for supporting a centrally apertured record disk D.

The motor board 11 is enclosed and concealed by an approximately rectangular dictating machine cabinet 14 having a front wall 15, a rear wall 16, and side walls 17, 18, which side walls are stepped rearwardly above the level of the motor board 11 so as to expose a minor front portion of the turntable 12.

The cabinet 14 also comprises a top wall 19 overlying a rear portion of the motor board 11 and terminating rearwardly of the spindle 13, provision being made of a vertically swingable cover 20 which is adapted to overlie the turntable 12 in approximately flush relationship with the top wall 19.

In order to perform recording and playback operations with respect to a disk D upon the turntable 12, the machine 10 is provided with a pair of carriages which are movable across opposite portions of said disk D, and which have phonographic transducers for forming and playing back a sound track on the disk. As shown, the carriages are in the form of swingable playback and recording arms 21, 22 which respectively comprise a playback head 23 and a recording head 24 having styli 25, 26.

The rear ends of the respective playback and recording arms 21, 22 are provided with mounting hubs 27, 28 (Fig. 6) having downwardly-extending tubular portions 29, 30 which rest upon ball bearing assemblies 31, 32, supported in the motor board 11, and which rotatably embrace upper portions of a pair of vertical feed shafts 33, 34, mounted in said bearing assemblies.

The vertical axis of the playback feed shaft 33 is located upon the forward and rearward center line of the dictating machine 10 so as to be symmetrically disposed with respect to the front of the cover 20, for reasons to be described hereinafter.

In order that equal swinging movements of the playback and recording arms 21, 22 shall cause the styli 25, 26 to have equal lateral movements, the arms 21, 22, the heads 23, 24, and the hubs 27, 28 are carefully proportioned so that the styli 25, 26 are equidistant from the axes of the respective feed shafts 33, 34. Further, the axes of the feed shafts 33, 34 are made equidistant from the axis of the turntable spindle 13. Thus, it will be seen that the styli 25, 26 are adapted to describe equivalent lateral paths across opposite portions of the turntable 12.

A pair of identical worm gears 35, 36 are applied with a press fit to the feed shafts 33, 34, and are disposed against heads 37, 38 at the lower ends of said shafts below the motor board 11. The worm gears 35, 36 are engaged with a suitable common drive means such as a horizontal worm 39 disposed between said gears. The worm 39 and the gears 35, 36, are preferably located in a chamber 40 formed at the lower side of the motor board 11 and closed by a bottom cover 41, whereby a suitable lubricant may be retained around said gears and dust may be excluded.

In order to swing the playback and recording arms 21, 22 in opposite horizontal directions, the feed shafts 33, 34 are provided with threaded reduced upper ends 42, 43 carrying centrally apertured circular pressure springs 44, 45, each comprising a plurality of downturned peripheral spring arms frictionally engaged with flat annular surfaces 46, 47, within the respective hubs 27, 28.

Friction washers 48, 49 of fiber or other suitable material are applied to the upper shaft ends 42, 43 above the pressure springs 44, 45, and are held under pressure by means of tension nuts 50, 51, which are secured against accidental change of adjustment by means of jam nuts 52, 53.

The feed shafts 33, 34 are held in place against the upwardly exerted force of the pressure springs 44, 45 by ring-shaped bearing flanges 54, 55, which extend downwardly from the lower surface of the motor board 11 concentrically with the feed shafts 33, 34, and which engage anti-backlash friction disks 56, 57, upon the upper surface of the worm gears 35, 36.

Thus, it will be seen that the pressure springs 44, 45 will hold the mounting hubs 27, 28 firmly in position against the bearing assemblies 31, 32, and will, in conjunction with the friction washers 48, 49, provide respective friction couplings whereby rotation of the feed shafts 33, 34 will swing the playback and recording arms 21, 22 while at the same time permitting said arms to be manually swung independently of the operation of said feed shafts.

It will also be seen that the bearing diameter of the friction disks 56, 57 engaging the ring-shaped flanges 54, 55 is considerably greater than the diameter of the friction washers 48, 49, whereby the effective frictional action of the disks 56, 57 will be relatively large and will at all times prevent backlash between the worm gears 35, 36, and the worm 39. This construction of the disks 56, 57, and the worm gears 35, 36 also provides the feed shafts 33, 34 with wide effective bases in engagement with the ring flanges 54, 55, whereby said shafts are stabilized and precisely held in parallel vertical positions.

Figure 3:
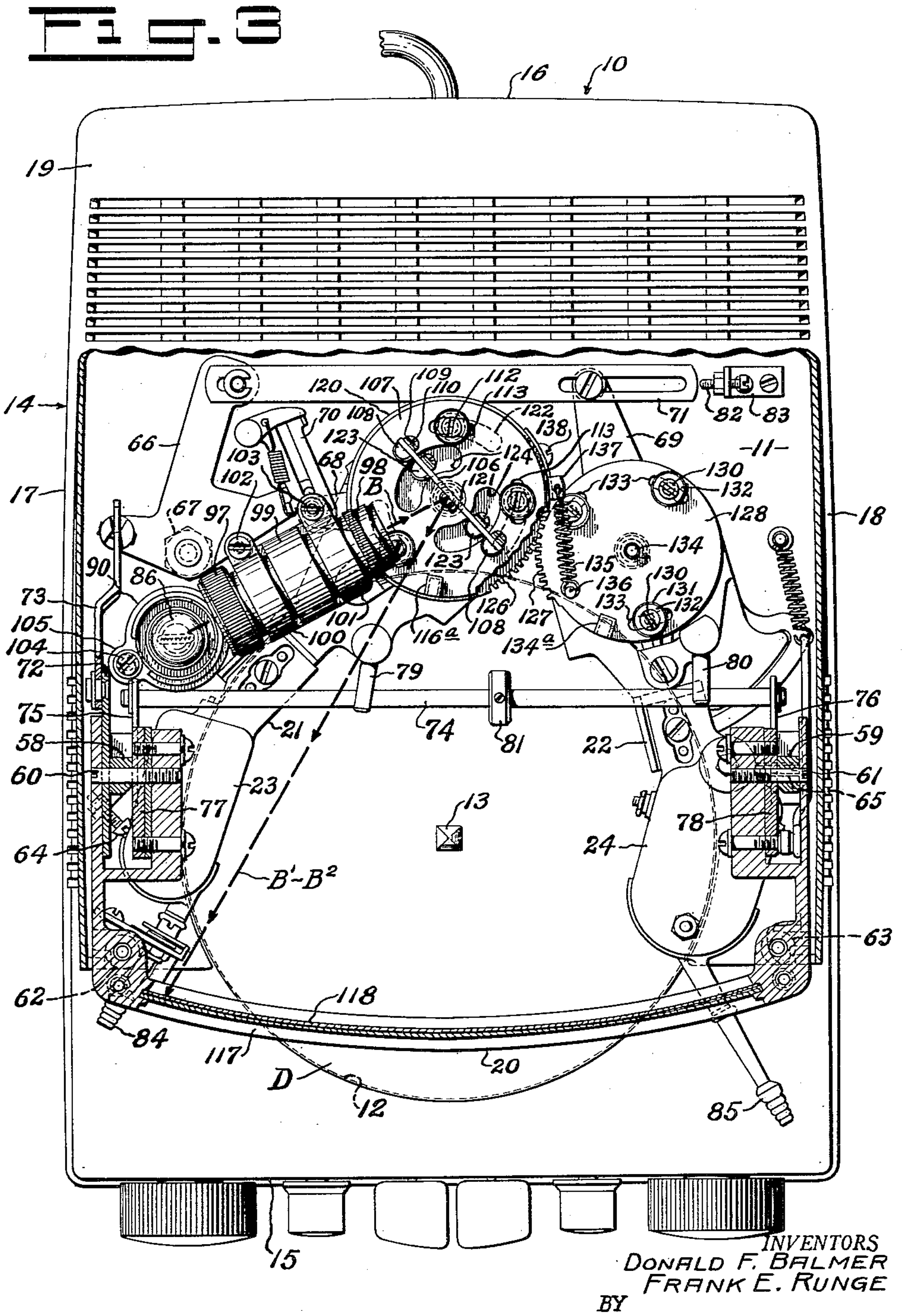
Fig. 3 is a cross sectional plan view similar in location to Fig. 2, but showing the apparatus as it would appear when both the recording and playback arms are disposed in starting positions for forming or engaging an initial turn of the record groove adjacent the periphery of the disk.

In order to swingably support the cover 20 and thus permit the operator to have access to the record disk D, the motor board 11 is provided with a pair of left and right hand stanchions 58, 59 respectively (Figs. 2 and 3), which are located adjacent opposite edges of the turntable 12, and which have laterally apertured upper ends.

The opposite rear corner portions of the cover 20 are attached to the upper ends of the stanchions 58, 59 by means of pivot screws 60, 61, respectively, while the front portion of the cover 20 will be supported, when the latter is in its closed position, by means of posts 62, 63 which are provided on the motor board 11 adjacent the front edges of the rearwardly stepped portions of the cabinet side walls 17, 18.

As a means for limiting outward movement of the playback and recording arms 21, 22 toward the periphery of the disk D, the stanchions 58, 59 support inwardly extending adjustable stop screws 64, 65, respectively, which are adapted to be engaged by the playback and recording heads 23, 24. The recording head stop screw 65 will, of course, be so adjusted as to determine the starting location of the recording stylus 26 adjacent the edge of the turntable 12, while the playback stop screw 64 may be so adjusted as to determine a similar starting location of the playback stylus 25 adjacent the opposite edge of the turntable 12.

The dictating machine 10, may, if desired, be provided with the playback and recording arm retracting mechanism which is disclosed in the aforesaid patent application of DeNapoli and Runge, and which is operated by swinging movements of the cover 20.

Such a retracting mechanism comprises a horizontally swingable bell crank lever 66 which is mounted upon a vertical post 67 upon the motor board 11 rearwardly of the left-hand stanchion 58, and which is operatively connected by means of slotted links 70, 71 to radial arms 68, 69 integrally formed with the arm mounting hubs 27, 28, respectively. The cover 20 is provided with a rearwardly extending arm 72 which is connected to the bell crank lever 66 by means of a link 73, so that upward swinging movement of the cover 20 will cause the playback and recording arms 21, 22 to be retracted against the stop screws 64, 65.

The slotted construction of the connecting links 70, 71 is provided in order to permit the cover 20 to be closed without disturbing said arms 21, 22 when the latter are in their fully retracted positions, and also to avoid interference with the operation of said arms when said cover is in closed position.

The retracting mechanism also comprises a horizontal lifting rod 74, which is mounted upon a pair of lifting levers 75, 76 in such a position as to extend laterally above central portions of the playback and recording arms 21, 22. The lifting levers 75, 76 are pivoted to the stanchions 58, 59, and are adapted to be operated by cam pieces 77, 78 secured to the cover 20.

The arrangement of the lifting levers 75, 76 and the cam pieces 77, 78 is such that upward movement of the cover 20 will raise the lifting rod 74, thus lifting the playback and recording arms 21, 22 by means of studs 79, 80 which are mounted on said arms and which overhang said lifting rod.

The lifting rod 74 preferably carries an adjustable apertured disk 81 which is adapted to be engaged by the lifting stud 79 and will serve as an inner stop for swinging movement of the playback arm 21.

An inner stop for the recording arm 22 is provided in the form of a stop screw 82 which is adjustably supported by a bracket 83 attached to the motor board 11, and which is adapted to be engaged by the rearwardly-extending radial arm 69 on the mounting hub 28.

The playback and recording heads 23, 24 have respective handles 84, 85 which extend forwardly beyond the front edge of the cover 20 so as to facilitate manual swinging of the arms 21, 22.

As a source of light for the improved optical indicating apparatus, provision is made of an electric lamp 86 which preferably has a filament approximately disposed in a single vertical plane and which is held in an upright position in a socket 87 (Fig. 5) having a pair of lead wires 88 adapted to be connected to any suitable source of electric current. The socket 87 is frictionally supported in a vertical tubular base portion 89 of an optical assembly mounting 90, said base portion being held in a sleeve 91 which is integrally formed with the motor board 11 at a location to the rear of the left-hand cover stanchion 58.

In order to form a narrow concentrated fixed light beam B, provision is made of a condenser lens 92, and a disk 93 having a narrow vertical slit 94, and rear and front projection lenses 95, 96, respectively, all of which are successively arranged upon a horizontal axis above the level of the arm mounting hubs 27, 28 and aligned with the source of light as represented by the lamp 86. Further, the plane of the lamp filament is disposed at a small angle to said axis so that the condenser lens 92 will concentrate a large part of the light therefrom upon the vertical slit 94. Provision is also made of a cylindrical shield 96*a* which is supported upon the mounting 90 in such a position as to surround the lamp 86 and thus prevent the escape of unwanted light therefrom in a horizontal direction, and a notch 96*b* being formed in said shield to permit the light to reach the condenser lens 92.

The condenser lens 92 and the disk 93 are mounted in a condenser lens barrel 97, and the two projection lenses 95, 96 are mounted in a projection lens barrel 98, both of said lens barrels being held in a horizontal tubular arm 99 which forms a part of the mounting 90 extending radially from the lamp 86.

Opposite end portions of the mounting arm 99 are partially separated from the central portion of said arm and are split in order to form circular clamps 100, 101 having clamping screws 102, 103, respectively, so that the lens barrels 97, 98 may be longitudinally adjusted for properly focusing the lenses.

Any necessary angular adjustment of the light beam B in a horizontal direction may be obtained by rotating the base portion 89 of the mounting 90 in the motor board sleeve 91, said mounting being held firmly in adjusted position by a screw 104 which extends through a slotted lug 105 formed integrally with the mounting 90 and is engaged in said sleeve 91.

The light beam B is directed to the vertical axis about which the playback arm 21 swings, at which axis an upper portion of said light beam impinges the reflecting surface of a suitable reflecting element such as a flat mirror 106 which rotates with the swinging movement of the playback arm 21. The mirror 106 is preferably of the "first-surface" type, in which reflection occurs at the front or first surface impinged by the light beam, so that double images and other inaccuracies in the reflection will be minimized.

The mirror 106 is so disposed as to direct the reflected portion of the light beam B forwardly as the indicating beam B–1, and is supported upon the playback arm mounting hub 27 by means of a mirror mounting 107 which is in the form of a disk having a pair of upstanding stepped posts 108 in diametrical relationship adjacent opposite edges thereof.

Opposite end portions of the mirror 106 are retained against upper portions of the stepped posts 108 by means of a pair of spring clips 109 (Figs. 7 and 8) held by screws 110, said posts 108 being so constructed as to hold the reflecting surface of the mirror 106 accurately in a vertical plane coinciding with the vertical axis of the playback arm feed shaft 33.

The mirror mounting 107 is supported upon the mounting hub 27 by a series of three upstanding posts 111 which are integral with said hub and each of which carries a headed shoulder screw 112 (Figs. 7 and 9). The mirror mounting 107 is provided with elongated apertures 113 freely embracing the shoulder screws 112 in such a manner as to permit rotative adjustment of said mirror mounting, and is supported upon the upper ends of shoulder bushings 114 on said screws between said mounting and the upper ends of the posts 111.

Provision is made of flat washers 115 and curved spring washers 116 between the upper surface of the mirror mounting 107 and the heads of the screws 112, whereby said mirror mounting is frictionally clamped against the shoulder bushings 114 so as to prevent accidental movement thereof with respect to the mounting hub 27, while permitting rotative adjustment of said mounting when desired. This adjustment will be facilitated by a radial apertured boss 116*a* (Figs. 2, 3, and 4) which is formed on the upper surface of the mirror mounting 107 and which may be readily engaged from the front of the machine 10 by a suitable adjusting bar or tool.

In order to provide a screen upon which the light beam B–1 may form an image, the front vertical portion of the cover 20 has an elongated horizontal window opening 117 in which a curved translucent scale 118 is mounted, said scale being disposed at such a level as to intercept the indicating beam B–1 when the cover 20 is in closed position.

In view of the foregoing, it will be seen that when the electric lamp 86 is energized and the cover 20 is in closed position, any swinging movement of the playback arm 21 will cause a proportioned swinging of the light beam B–1, so that the lateral position of the playback stylus 25 with respect to the record disk D will be indicated upon the scale 118.

The scale 118 is preferably graduated and numbered in such a manner as to indicate the time in minutes which elapses during operation of the playback arm 21, taking into account the speed at which said arm is driven by the driving worm 39. Further, the scale graduations may be approximately uniform end to end of the scale, since the light beam B–1 is reflected from a point which is at the axis of the playback feed shaft 33, and therefore symmetrically located with respect to the cover 20 as hereinbefore described.

It will be noted that all of the movements of the stylus 25 and the maximum range of said movements will be so magnified, as represented upon scale 118, that the total range of movement will occupy the length of the scale, and will extend for almost the full width of the dictating machine 10. It will be understood that this magnification is due partly to the fact that the mirror 106 will cause the light beam B–1 to have double the angular movement of the playback arm 21, and partly to the fact that the scale 118 is located forwardly of the stylus 25.

In order to provide a light beam index for the recording arm 22, provision is made of a flat, vertical, "first-surface" mirror or other reflecting element 119 which is similar in operation to the flat mirror 106, and which reflects a lower portion of the light beam B so as to produce an indicating beam B–2.

The flat mirror 119 is so arranged that the light beam B–2 will be directed against the translucent scale 118 and will have a range of swinging movement which is congruent with the range of the light beam B–1. Further, the mirror 119 may be so adjusted that the light beam B–2 will be superimposed upon the light beam B–1 when the playback and recording styli 25, 26 are engaged in the same turn of the groove in the record disk D, or when said styli occupy some other predetermined relationship.

This operation of the light beam B–2 is obtained by supporting the flat mirror 119 upon a lower mirror mounting disk 120 directly below the mirror 106, so that the reflecting surface of said mirror 119 will intercept the light beam B at a point which is vertically aligned both with the axis of the playback arm feed shaft 33, and with the reflecting surface of the mirror 106.

Inasmuch as the playback and recording arms 21, 22 are oppositely disposed with respect to the center of the record disk D, means is provided for reversing the movement of the mirror 119 as compared with the swinging movement of the recording arm 22, said means comprising the disk or lower mirror mounting disk 120 which is rotatably supported on the upper ends of the posts 111 below the upper mirror mounting 107 (Figs. 6 and 9).

The lower mirror mounting 120 is rotatably held in centered relationship to the feed shaft 33 by a reduced upward extension 121 of said feed shaft, a plurality of curved slots 122 being formed in said mirror mounting 120 for accommodating the shoulder bushings 114 and permitting free rotation of said mounting with relation to the hub 27. The feed shaft extension 121 also extends through the upper mirror mounting 107, thus maintaining said mounting in accurately centered position independently of the shoulder screws 112. It will be understood that the shoulder bushings 114 are of a sufficient height to avoid clamping the lower mirror mounting 120 and thus interfering with its movements.

In order to support the mirror 119, the mounting 120 comprises a pair of upstanding stepped posts 123, which extend freely through a pair of curved slots 124 in the upper mirror mounting 107 inwardly of the posts 108. The stepped posts 123 hold the mirror 119 by means of spring clips 125, and are similar in construction to the posts 108.

Swinging movements of the recording arm 22 will operate the mirror 119 by means of a plurality of gear teeth 126 which are formed on one edge of the mirror mounting 120 and which are meshed with teeth 127 of a gear sector disk 128 on the recording arm mounting hub 28, the teeth 126, 127 being formed on equal radii. The gear sector disk 128 is supported upon a plurality of upstanding posts 129 integral with the mounting hub 28 (Figs. 6 and 10), and is frictionally clamped to said posts by screws 130 having flat washers 131 and curved spring washers 132 thereon.

Rotative adjustment of the gear sector disk 128 is permitted, however, by elongated apertures 133 which accommodate the screws 130 in said sector disk, the accurate centering of said disk being maintained by an upward extension 134 of the feed shaft 34. A radial apertured boss 134*a* (Figs. 2, 3, and 4) is formed on the upper surface of the sector disk 128 to facilitate angular adjustment of said disk and the mirror 119.

The accuracy of the light beam B–2 is enhanced by a coiled spring 135 having its respective ends connected to a stud 136 on the gear sector disk 128, and to a bracket 137 attached by means of a screw 138 to a rear edge portion of the lower mirror mounting 120, whereby said spring will exert a tangential force which will eliminate any lost motion or backlash between the gear teeth 126 and 127. As shown in Fig. 7, the bracket 137 has a slot 139 in which the screw 138 is engaged, whereby the tension of the anti-backlash spring 135 may be adjusted.

In view of the foregoing, it will be seen that, while the playback and recording arms 21, 22 will be required to swing in opposite directions in order to follow a spiral record groove (that is, toward the center of the record disk D), the mirrors 106 and 119 will be rotated in the same direction so that the same consecutively numbered scale 118 will be utilized by both of the light beams B–1 and B–2 for indicating the exact positions of the styli 25, 26.

*Adjustment and operation*

After the improved optical indicating apparatus has been fully assembled in the dictating machine 10, the apparatus will be checked and the necessary adjustments will be made in order to place the system in proper operating condition.

These adjustments will include horizontal angular adjustment of the optical assembly mounting 90, as permitted by the screw 104, so that the light beam B will intersect the axis of the feed shaft 33, at which location vertically aligned upper and lower portions of said light beam will impinge upon the mirrors 106 and 119 respectively.

Inasmuch as the flat mirrors 106 and 119 and the mounting posts 108 and 123 will be manufactured to very close tolerances, no adjustment of said mirrors will be necessary to bring the reflecting surfaces thereof into a true diametrical relationship with respect to the feed shaft 33.

The fixed light beam B will then be focused so that the indicating beams B–1, B–2 will produce sharp images of the vertical slit 94 upon the scale 118, this operation being accomplished by adjusting the projection lens barrel 98 in the desired manner, as permitted by the clamping screw 103. Inasmuch as the light beams B–1, B–2 traverse equal distances, it will be seen that a single adjustment of the projection lens barrel 98 will serve to focus both beams simultaneously.

The light beams B–1, B–2 will then be adjusted to coincide on the scale 118 when the styli 25, 26, occupy a predetermined relationship to each other. This relationship may, for example, be one in which the styli 25, 26 engage the same turn of the record groove in the disk D or, in other words, in which said styli are equidistant from the turntable spindle 13.

This may be done by first swinging the playback and recording heads 23, 24 outwardly against the stop screws 64, 65, assuming that said stop screws have already been adjusted so as to locate the styli 25, 26 equidistantly from the turntable spindle 13.

The playback mirror mounting 107 will then be rotated with respect to the mounting hub 27 so as to swing the mirror 106 until the light beam B–1 is directed against the zero point of the scale 118.

The recording mirror 119 will then be adjusted so as to direct the light beam B–2 upon the zero point of the scale 118 in superimposed relationship to the light beam B–1, this adjustment being accomplished by turning the gear sector disk 28 and the mirror mounting 120 meshed therewith.

The optical indicating system will now be in proper adjustment, and if the dictating machine 10 is placed in operation with a record disk D upon the turntable 12, the light beams B–1 and B–2 will remain in superimposed relationship while progressing through congruent ranges of movement across the scale 118 as the styli 25, 26, are driven in opposite directions inwardly toward the turntable spindle 13.

During such operation, the styli 25, 26 will, of course, remain in engagement with the same turn of the spiral groove as they progress across the record disk D. If, however, the relative positions of the styli 25, 26 should be disturbed, as for example, when the user swings the playback arm 21 rearwardly against the force of the friction washer 48 so as to review a previously recorded portion of the disk D, the light beams B–1 and B–2 will no longer be superimposed upon the scale 118, but will give separate indications thereon which will accurately show upon said scale the positions of the respective styli 25, 26.

When such a reviewing or playback operation is terminated, the user may restore the previous relationship of the playback and recording heads 23, 24 (in which the styli 25, 26 will engage the same turn of the groove) merely by swinging the playback arm manually until the light beam B–1 again coincides with the light beam B–2 upon the scale 118.

In utilizing an unused portion of a partially recorded disk, one method by which the user may readily locate the point at which the new recording should be started will be to operate the playback arm 21 until the end of the previously recorded groove is located by the stylus 25, after which the recording arm 22 may be manually swung against the force of the friction washer 49 until the light beam B–2 coincides with the light beam B–1. The recording stylus will then be in the proper location to start recording upon the unused portion of the disk D.

It will be understood that upward movement of the dictating machine cover 20 will operate the retracting mechanism so as to swing the playback and recording heads outwardly against the stop screws 64, 65 as described in the above-mentioned application of DeNapoli and Runge, whereupon the light beams B–1 and B–2 will be restored to superimposed relationship at the zero mark of the log scale 118.

*Quick review operation*

One advantage of the optical indicating apparatus herein disclosed is that it will provide a means whereby the playback and recording styli 25, 26 may be readily placed in such a relationship that the last-recorded portion of the dictation may be quickly reviewed, without requiring any manipulation of the playback or recording arms 21, 22, on the part of the operator.

This "quick review" relationship of the styli may be established by shifting the playback head 23 manually so that the stylus 25 engages the record groove a few turns (e. g. three or four) behind the recording stylus 26, and may be readily ascertained merely by observing the relative positions of the indicating light beams B–1, B–2 upon the scale 118. The playback arm 21 will then have a trailing relationship to the recording arm 22 which will remain constant while the arms 21, 22 are driven across the disk D at identical speeds by the drive worm 39.

If desired, simple adjustments may be made which will facilitate the establishment and maintenance of the trailing or "quick review" relationship of the playback stylus 25. These adjustments will involve an outward adjustment of the playback stop screw 64 so that the starting position of the playback stylus 25 will be slightly farther from the center of the disk D than is the starting position of the recording stylus 26.

Further, the playback mirror 106 will be rotatively adjusted so as to superimpose the light beam B–1 on the beam B–2 when the styli 25, 26 are at their newly adjusted relative starting positions. When so adjusted, the superimposed relationship of both light beams B–1, B–2 will always indicate a trailing relationship of the playback stylus 25 at any point upon the scale 118.

When the playback stylus 25 is disposed upon the disk D in trailing relationship to the recording stylus 26, said playback stylus will always be in readiness to play back the material which has been recorded during the last previous three or four revolutions of said disk, thus enabling the operator to pick up his thread of thought easily after an interruption of his dictation without requiring that he direct his attention to manual operation of the playback and recording arms 21, 22.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a dictating machine, means for supporting and rotating a record disk, a playback arm and a recording arm mounted for swinging movement about different respective axes across portions of said disk at opposite sides of the center thereof, a common scale, and a pair of means mounted for individual independent rotation about the axis of one of said arms for projecting and swinging a pair of indicating light beams longitudinally across said scale, one of said projecting means being fixed to said one of said arms, and the other of said projecting means being connected to the other of said arms by a device for producing reverse rotation of said other projecting means with relation to said other arm, whereby swinging movement of said playback arm and said recording arm in following a spiral groove in said record disk may cause said indicating light beams to progress in the same direction across said scale.

2. In a dictating machine, a record supporting turntable having a central spindle, a recording arm, and a playback arm pivotably mounted on different vertical axes located equally distant from said spindle for separate independent movement over said record, means for producing a narrow vertical beam of light, a first horizontal mirror mounted in the path of said light beam on the axis of said playback arm, a gear on said recording arm concentric with the pivot thereof, a reversing sector gear on the axis of said playback arm and meshing with said recording arm gear, a second horizontal mirror on said sector gear located below said first mirror and in the path of said light beam, a common horizontal scale upon which the beams of light from said mirrors are adapted to impinge, said scale being translucent whereby the separate and independent movements of said recording and playback arms may be simultaneously viewed on said common scale.

3. The invention as defined in claim 2, in which provision is made of a pair of slots in said playback arm and a pair of upstanding posts on said sector extending through said slots for supporting the horizontal recording arm mirror thereabove.

4. The invention as defined in claim 3, in which said mirrors are detachably mounted on said playback arm and said reversing sector respectively by means of two pairs of aligned closely spaced resilient clips, located at the opposite ends of said mirrors.

References Cited in the file of this patent

UNITED STATES PATENTS

| | | |
|---|---|---|
| 1,489,436 | Hess | Apr. 8, 1924 |
| 1,899,804 | Hopefield | Feb. 28, 1933 |
| 1,939,161 | Bestelmeyer | Dec. 12, 1933 |
| 2,085,887 | Atkinson | July 6, 1937 |
| 2,138,875 | Meissner | Dec. 6, 1938 |
| 2,253,980 | Parker | Aug. 26, 1941 |
| 2,288,243 | Hyde | June 30, 1942 |
| 2,464,064 | Thompson | Mar. 8, 1949 |
| 2,637,557 | Stone | May 5, 1953 |

FOREIGN PATENTS

| | | |
|---|---|---|
| 15,861 | Great Britain | Nov. 28, 1912 |
| 481,051 | Great Britain | Mar. 4, 1938 |